United States Patent [19]

Tuckey

[11] Patent Number: 4,646,700

[45] Date of Patent: Mar. 3, 1987

[54] PRESSURE REGULATOR FOR LIQUID FUEL SYSTEM

[75] Inventor: Charles H. Tuckey, Cass City, Mich.

[73] Assignee: Walbro Corporation, Cass City, Mich.

[21] Appl. No.: 828,181

[22] Filed: Feb. 11, 1986

Related U.S. Application Data

[63] Continuation-in-part of Ser. No. 724,327, Apr. 17, 1985, abandoned.

[51] Int. Cl.[4] ............................................. F22B 37/24
[52] U.S. Cl. .................................... 123/510; 137/510; 92/97; 92/103 M
[58] Field of Search ................. 137/510; 92/97, 98 D, 92/103 M; 123/510, 511, 512, 514

[56] References Cited

U.S. PATENT DOCUMENTS

| | | | |
|---|---|---|---|
| 697,702 | 4/1902 | Buckley | 137/510 |
| 1,466,243 | 8/1923 | Neal | 92/103 M X |
| 1,786,844 | 12/1930 | Hesselman | 137/510 |
| 1,946,188 | 2/1934 | Birch | 137/510 X |
| 2,074,292 | 3/1937 | Wilkins | 137/510 |
| 2,103,725 | 12/1937 | Jacobsson | 137/510 |
| 2,577,967 | 12/1951 | Hughes | 92/97 X |
| 2,704,548 | 3/1955 | Ralston | 137/510 X |
| 3,106,219 | 10/1963 | Teston | 137/510 |
| 3,298,285 | 1/1967 | Webb | 92/98 R X |
| 3,419,039 | 12/1968 | Monnich | 137/510 |
| 3,433,132 | 3/1969 | James | 92/98 R X |
| 3,503,307 | 3/1970 | Migdal | 92/103 M X |
| 3,746,036 | 7/1973 | DuBois | 137/510 X |
| 3,908,684 | 9/1975 | Short | 137/68.1 |
| 4,480,658 | 11/1984 | Blaeslee | 137/510 X |

Primary Examiner—Harold W. Weakley
Attorney, Agent, or Firm—Barnes, Kisselle, Raisch, Choate, Whittemore & Hulbert

[57] ABSTRACT

A pressure regulator valve for use in fuel systems for internal combustion engines which includes a two-part housing lamination with a diaphragm between the bottom and top housings and a centering valve guide disc above the diaphragm. The diaphragm is responsive to fuel pressure and will open a valve to by-pass fuel to a fuel tank. The centering valve guide disc functions to locate a diaphragm backing disc above the valve seat. A preferred diaphragm is formed of thin metal such as stainless steel which is confined at its periphery by housing elements to avoid destructive deformation in maximum pressure testing. In another embodiment, the metal operating diaphragm is secured at its periphery and formed in a manner to react in response to pressure to counteract increased spring force of a diaphragm backing spring. A press-in spring cap or cup allows calibration of the unit during assembly with a strike-in to fix the calibration in a tamperproof structure.

3 Claims, 7 Drawing Figures

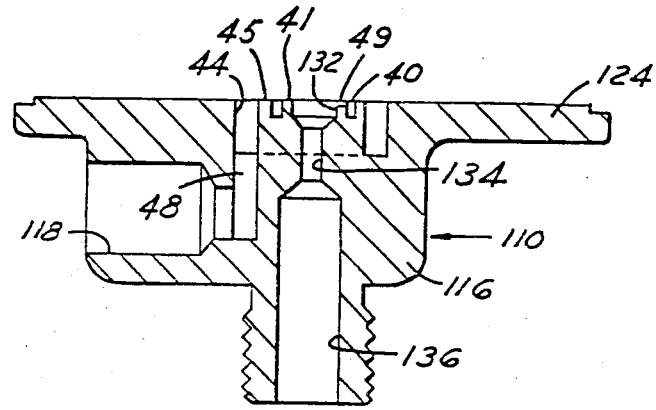
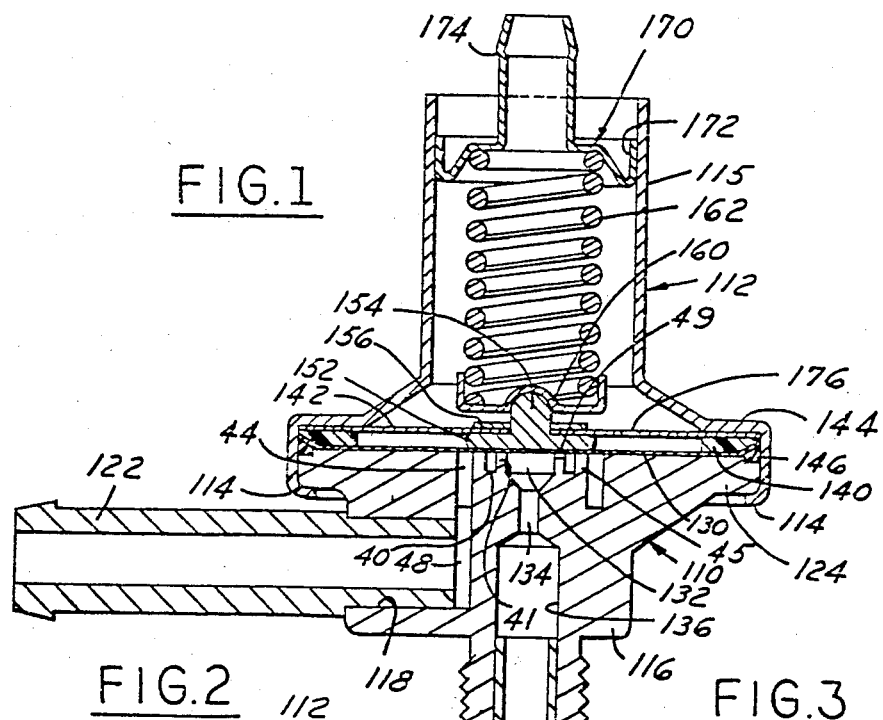
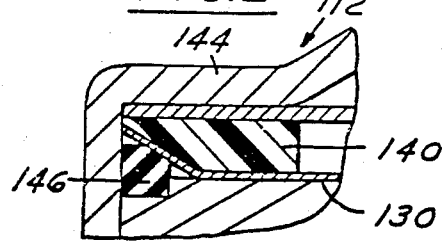
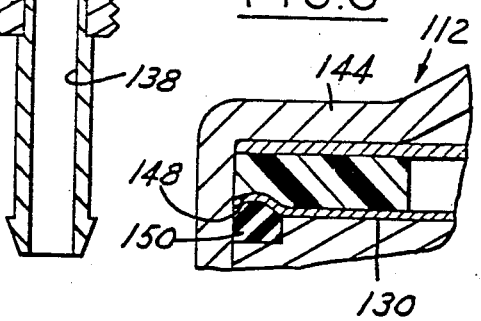

PRESSURE REGULATOR FOR LIQUID FUEL SYSTEM

REFERENCE TO PARENT APPLICATION

This application is a continuation-in-part of my copending application, Ser. No. 724,327, filed Apr. 17, 1985, now abandoned and entitled Pressure Regulator for Liquid Fuel System.

REFERENCE TO RELATED APPLICATIONS

Reference is made to my copending United States application, Ser. No. 642,776, filed Aug. 21, 1984, on a Pressure Regulator With Variable Response, now issued into U.S. Pat. No. 4,543,935 on Oct. 1, 1985, and to my copending application, Ser. No. 717,017, filed Mar. 28, 1985, on a Fuel Pressure Regulator.

FIELD OF INVENTION

Automotive fuel systems in which a pressure regulator is interposed in a fuel supply line to regulate pressure of fuel.

BACKGROUND OF INVENTION

Constant pressure regulator valves have been utilized in automotive fuel systems for quite some time. One example is found in a United States patent to Fehrenbach et al, U.S. Pat. No. 3,511,170, issued May 12, 1970.

It is an object of the invention to provide an improved regulator valve which has a quick response to the varying pressures in a fuel circuit. It is a further object to provide a regulator valve which responds with a full opening of the valve area when the pressures in the system are such that by-passing of fuel is required.

A still further object is the design of a spring backing assembly which is independent of the squareness of the spring pressure and independent of any cocking of the spring in compression. A further feature is the provision of a combination diaphragm and valve surface which insures a full shut off of the regulator when the engine being supplied with fuel is not operating.

Another object and feature of the invention lies in the use of a metallic diaphragm material and in which all functional parts are metal which will successfully resist deterioration from the hydrocarbon fuels and which will act to stabilize the valve action and supplement the action of a diaphragm backing spring. In addition, the metallic diaphragm is formed to provide an inherent spring action in operation so that when acting to open the regulator valve, it will counteract the increased spring force of a backing spring and enable the achievement of a truly constant pressure output.

Another feature lies in a self-centering valve back-up plate which eliminates friction.

A further object lies in the construction of the valve housing which facilitates assembly and initial fixed pressure calibration which prevents subsequent maladjustment by a user.

Numerous objectives and features of the invention will be apparent in the following specification and claims in which the invention is described together with details to enable persons skilled in the art to practice the invention, all in connection with the best mode presently contemplated for the invention.

BRIEF DESCRIPTION OF THE DRAWINGS

DRAWINGS accompany the disclosure and the various views thereof may be briefly described as:

FIG. 1, a vertical section of a pressure regulator assembly.

FIG. 1A, a separated view of the bottom housing of the regulator.

FIG. 2, an enlarged partial section showing a peripheral configuration for a diaphragm.

FIG. 3, a partial section showing a modified peripheral treatment.

DETAILED DESCRIPTION OF THE INVENTION AND THE MANNER AND PROCESS OF USING IT

Figure 4:
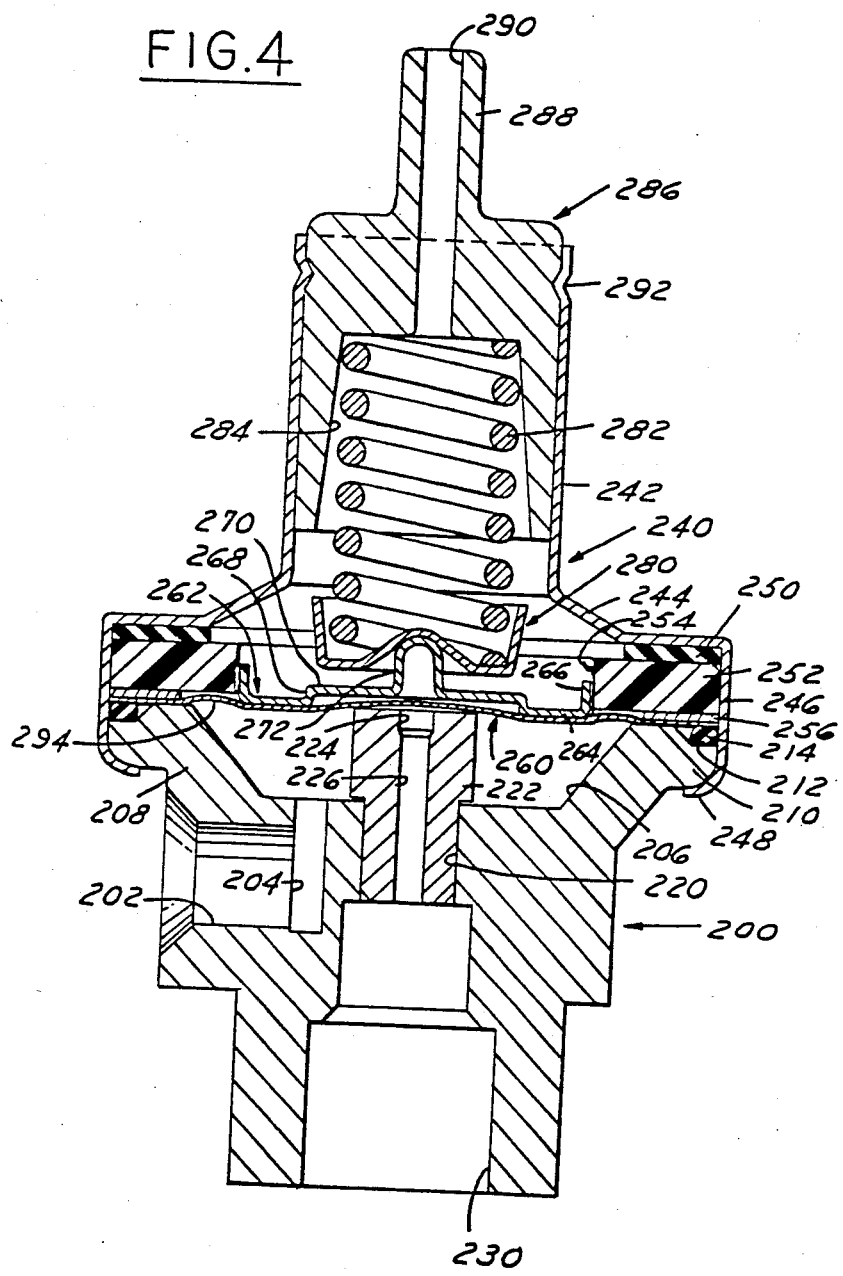
FIG. 4, a sectional view of a regulator assembly in modified construction.

With reference to the drawings, in FIG. 1, a base housing 110 is capped by a top closure housing 112 which has a depending outer flange spun in at 114. The housing 112 has a neck portion 115 rising centrally to receive a compression spring to be described. The base housing has a central body portion 116 with a side port 118 into which a connector nipple 122 is press fitted. The base 110 has a radially extending flange 124, the top surface of which is flat to support a flexible diaphragm 130.

The central portion of the flat top surface of base 110 shown in FIGS. 1 and 1A has a central recess 132 which ensmalls to a calibrated passage 134 leading to an outlet port 136 and a fuel tank connector 138. The ensmalled passage 134 is calibrated according to the pressure range desired for the regulator.

The valve seat area in FIG. 1 is in the area of the flat surface of base housing 110 surrounding the central recess 132 and includes the annular ridge 45. A first annular groove 40 spaced outwardly from recess 132 defines an annular ridge 41 and a second annular groove 44 defines a second annular ridge 45 and is connected to side port inlet 118 by passage 48. A cross passage 49 connects the annular groove 40 and the central passage 132.

The diaphragm 130 in this embodiment in FIG. 1 is formed of thin stainless steel with a thickness ranging from 0.001" to 0.005". A thickness of 0.003" has been found to be satisfactory. This metal diaphragm is thin but relatively stiff, but it is resistant to any stretching and inert to all hydrocarbon fuels.

No rubber or synthetic material has been found which is totally inert relative to liquid fuels such as gasoline or methanol. This is especially true with fuels which alter (turn sour) after long periods of storage.

Another feature of the metal diaphragm lies in its flat characteristic so that it lies flat across the seat area of the regulator housing. The stiffness of the diaphragm causes it to lift more directly upward of the valve seats as distinguished from a flexible diaphragm which may cock as it lifts. In addition, the metal diaphragm has a spring rate of its own which rises sharply as the diaphragm is lifted. The metal diaphragm also has a higher burst strength.

Continuing with the description of FIG. 1, above the diaphragm 130 is an annular spacer 140 surrounding the perimeter of the diaphragm. Above the spacer is a second diaphragm 142 of flexible diaphragm material; these parts are axially retained by the radial portion 144 of cap 112 and the inturned flange 114.

In FIGS. 2 and 3, the perimetric retention of the diaphragms 130 and 142 is illustrated. In FIG. 2, the spacer 140 has a bevel on the underside and the annular edge of housing 110 has a shallow groove to receive an O-ring 146. The O-ring 146 underlies the perimeter of the diaphragm 130. When the parts are compressed prior to the inturning of the flange 114, the O-ring 146 will distort the diaphragm perimeter and lock it securely at the edge. In FIG. 3, a modified version is illustrated wherein an annular recess 148 inside the perimeter of spacer 140 results in an arcing of the metal diaphragm at its perimeter by the pressure of the O-ring 150. Here again, the distortion of the diaphragm into the recess 148 locks the perimeter of the diaphragm 130.

A flat disc 152 having a central stud 154 with a domed end overlies the diaphragm 130 centrally of the assembly. The stud 154 perforates the upper diaphragm 142 and a small retaining washer 156 serves to retain the central portion of diaphragm 142 on the disc 152. A spring seat 160 has an outer flange to receive the inner end of a compression spring 162 and a hemispherical central recess to receive the top of stud 154.

The outer end of spring 162 is received in an outer spring retainer 170 having an inner recess to receive the spring, an outer flange 172 to fit within the neck portion 115 and tubular section 174 to serve as a connector.

In assembly, the diaphragms 130, 142, the spacer 140, and the O-ring 146 are established in the proper relative positions and the respective opposed housings compressed before the flange 114 is turned or spun into place. The spring 162 and retainer 160 are inserted and the outer retainer is placed over the outer end of spring 162. The entire assembly is then installed in a gauging circuit and the outer retainer is pressed into the neck 115 to obtain the desired spring pressure on the diaphragms. The neck 115 is then forcibly dimpled to fix the retainer 170 in place.

The completed regulators are tested for use by exposing them to as high a pressure as 150 to 175 pounds per square inch to insure that they are capable of withstanding the usual operating pressures.

It will be appreciated that compression springs do not always present a square end and thus the inner retainer 160 with the swivel connection with stud 154 will adjust to any variance and apply centered spring pressure to the diaphragms. The upper diaphragm 142 has a venting opening 176. This diaphragm serves as a centering device for the valve pad disc 152 and the inner spring retainer but actually does not serve as a diaphragm in the strict sense.

In the operation of the regulator of FIG. 1, pressure in fixture 122 and passage 48 will reach annular groove 44 and at a predetermined specified pressure will start to lift the diaphragm 130 against spring 162. This increases the spring force, but at the same time fuel pressure will reach groove 40 and thence through passage 49 reach central passage 132. Thus, the increased area in which the pressure is acting will counteract any increase in spring force. The movement of the diaphragm is very slight in the neighborhood of thousandths of an inch. Thus, the diaphragm will control the pressure coming from a pump supply.

In FIG. 4, a modified construction is illustrated in the cross-sectional view. A base housing 200 has a side port 202 to serve as a fuel inlet and terminating at a passage 204 opening to a dish-shaped cavity 206 bounded by an outwardly flaring wall 208 with a radially extending flange 210. An O-ring groove 212 is provided at the periphery for a sealing O-ring 214.

Centrally of the cavity 206 is a bore 220 into which is pressed a valve insert 222 having a flat top surface and a central fuel outlet passage 224 ensmalling at 226 to a calibrated passage leading to a fuel outlet port 230 at the base of the housing. This housing 200 can be formed as a die casting of a suitable metal.

A closure housing 240 may be formed as a sheet metal stamping with a neck portion 242 and an outwardly flaring flange portion 244 having a skirt 246 which, in assembly, is spun in at 248. Between the flange 210 of the base housing and the flange 244 of the closure housing are five parts, namely, an annular seal ring 250, an annular spacer 252 having a central cylindrical opening formed by an inner wall 254, a steel ring 256, a diaphragm 260 and an O-ring 214.

The diaphragm 260 is formed preferably of metal such as stainless steel having a thickness ranging from 0.001" to 0.005". The periphery of the diaphragm is preferably welded, in this embodiment, to the steel ring 256 at circumferentially spaced points to secure the periphery against pull out. The housings are assembled together with the intervening parts under axial pressure and the skirt portion 246 spun in at 248.

Above the diaphragm 260 is a shaped back-up plate 262 having an annular flat portion 264 with an outer upstanding annular flange or wall 266. At the inner dimension of flat portion 264 is a short axial annular flange 268 closed by a raised central wall 270 having a raised central portion projection 272 with a spherically domed top.

A backing spring assembly is composed of a dished spring seat 280 having a conical central portion with a surface complemental to the domed top of projection 272 and a skirt to retain one end of a coil spring 282. The other end of the spring 282 is seated in a recess 284 of an end plug 286 fitted into the neck portion 242 of housing 240. The plug 286 has a nipple end 288 with a central passage 290 for connection to an air inlet source of a fuel system.

In assembly, as previously described, the plug 286 will be moved into the neck portion 242 while the unit is in a gauged circuit and when the desired spring force is reached, the neck portion is mechanically dimpled at 292 around the periphery to secure the closure plug in a gauged position.

It will be seen that all of the parts exposed to hydrocarbon fuel are formed of metal so that deterioration by exposure to the fuel is practically eliminated.

The stainless steel diaphragm 260 in FIG. 4 is preferably preformed centrally within the inner diameter of the ring 256 into a shallow dome with a resulting height of about 0.010 to 0.020". The domed diaphragm is then welded peripherally to the ring 256 and the parts assembled as previously described. The diaphragm is then pre-stressed from the wet side, i.e., the side facing the valve insert 222 with a pressure of 180 to 200 pounds per square inch, to further shape and stabilize the diaphragm before a final adjustment on the backing spring. When the spring assembly is installed, the plate 262 will press down on the diaphragm moving it to essentially a stable position sealing the top of the valve insert and the diaphragm also assumes a shape with the annular corrugation at 294. This places the diaphragm under stress and trying to move back to the original shape, the corrugation exerting a lateral inward force. Thus, there is a resultant force tending to move the diaphragm upward as the backing spring is compressed. Because the diaphragm is formed of metal, it has its own spring rate which can function to counteract the increased spring force as the diaphragm starts to rise. When the pressure regulator is assembled, the pressure of the spring 282 acting on the back-up plate 262 causes the annular flat portion 264 to press on the diaphragm outside the insert 222 and this results in a slight doming effect on the diaphragm 260 as illustrated in FIG. 4 so there is an annular seal at the circular edge of the insert 222.

In the operation of the regulator illustrated in FIG. 4, when fuel pressure in inlet ports 202, 204 rises to the point that it can overcome the force of spring 282, the diaphragm will start to lift off the valve seat. This movement will tend to increase the spring force of spring 282 but the lifting of the diaphragm causes it to move upwardly by its own resilience, that is, to move from a stable position to an active state with a force counteracting the spring force and thereby stabilizing the overall spring force This might be described as an oil can effect or a toggle action, but it results in a very constant spring rate and thus a very effective pressure regulation.

Another feature of the assembly is a self-centering action of the back-up plate 262. If the plate tends to lift at one side, the flange 266 will cam on the wall 254 of spacer 252 and move the plate toward center. The flange 266 is spaced slightly from the wall 254 to allow this self centering action to take place. This eliminates friction of the back-up plate. The swivel connection between the spring seat part 280 and the projection 272 assures a balanced spring action on the back-up plate.

As described above, a further feature of the invention lies in the flexible metallic diaphragm in the central area below the raised central wall 270. This raised portion, together with the annular flat portion 264, allows the diaphragm 260 to dome slightly as viewed in FIG. 4 so there is an annular sealing contact with the circular edge of the valve insert 222.

In addition to the above features, another significant advantage results from the assembly illustrated in FIG. 4. It is very desirable that pressure in the recess 206 surrounding the valve insert 222 be maintained at or near the desired regulation pressure even when the engine being supplied with fuel is shut off. With the structure shown, the action during the down time is such that the spring 282 will continue to move the back-up plate 262 down; and the pressure of the annular flat portion 264, together with the clearance provided by ther recess under the raised central wall, will cause a tight no-leak seal on the valve insert 222. Thus, the pressure is maintained in the recess 206 which is a distinct advantage upon restart of the system. This, of course, presumes a check-valve at the pump outlet to prevent back bleed into the pump.

Figure 5:
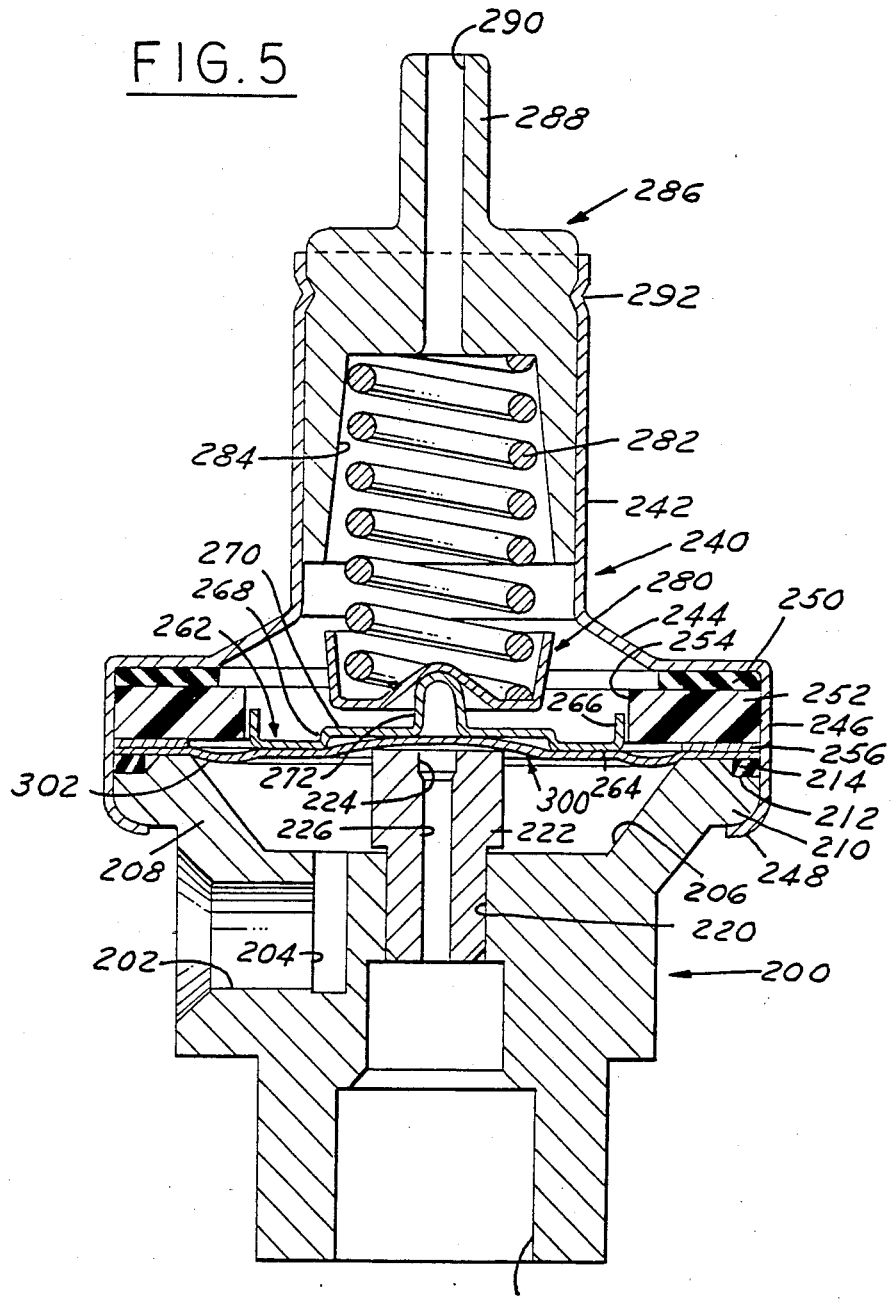
FIG. 5, a sectional view of a pressure regulator with a modified metal diaphragm configuration.

In FIG. 5, a sectional view similar to that of FIG. 4 is shown with a modified metal diaphragm 300. This diaphragm, preferably formed of stainless steel, is secured at its flat periphery to a metal ring 256, preferably steel, by spot welding or other suitable bonding means. The central portion of the diaphragm is also initially flat and separated from the flat periphery by a preformed annular corrugation 302.

When the diaphragm 300 is assembled and backed by a spring 282, it is pressed against the seat at the top of valve insert 222 surrounding the fuel outlet port 224 and this causes the central portion of the diaphragm to dome up as shown in the drawing, and results in an annular seal around the outside of the valve insert 222. The cavity central to the backing plate 270 permits this doming.

As previously described, when pressure develops in the cavity 206 surrounding the valve insert 222, it acts upwardly on the diaphragm 300. Because the diaphragm is formed of a resilient metal, it has its own spring rate which can function to counteract the increased spring force due to the compression of the spring. When the spring rises, the diaphragm reacts upwardly in a kind of oil-can effect to overcome the increased spring rate and effect a stable operation.

As an example, the metal diaphragm is preferably formed of 0.003" thick type 302, cold-rolled, full hard stainless steel with Rockwell "C" 40 to 45. The corrugation 302, in cross-section, is formed, 0.023"±0.003" from the center portion of the diaphragm with a radius of 0.300". The overall diameter of the diaphram is 1.630 to 1.640".

Figure 6:
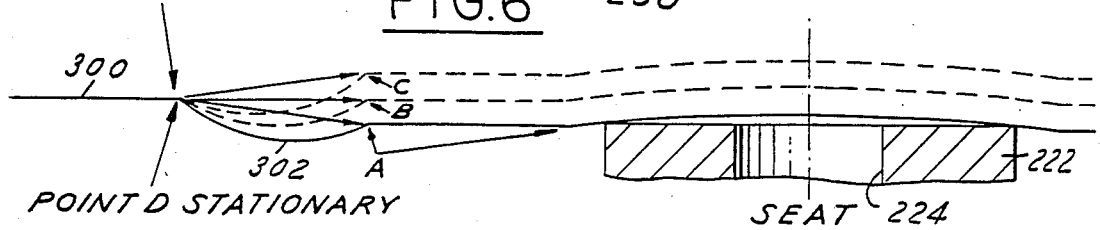
FIG. 6, a diagrammatic view of the diaphragm of FIG. 5 in various positions of dynamic motion.

In FIG. 6, the diaphragm 300 is shown diagrammatically over the top of the seat insert 222. The corrugation 302 is illustrated and the points A are the at-rest positions when the diaphragm is being pressed down against the seat by the backing spring 282. The vector directed to point A is downward. As pressure acts on the lower surface of the diaphragm, the diaphragm starts to rise and the vector at point B is approximately horizontal. Above this point, however, the vector force starts to have an upward force as illustrated at point C. Thus, the inherent resilience of the diaphragm, as the vector forces move over center, tends to move the diaphragm upwardly to overcome the increased spring rate of spring 282. This embodiment has an advantage that it can be used on low pressure or high pressure applications without modification.

What I claim is:

1. A pressure regulator for use in a fuel system for internal combustion engines utilizing a fuel pump and an air supply and including a base housing having a fuel inlet and a fuel outlet with a regulator valve opening interposed therebetween, and a closure housing secured to said base housing, that improvement which comprises a first diaphragm formed of a thin metal sheet overlying said valve opening and having a peripheral portion clamped between adjacent annular overlying portions of said housings, an annular spacer overlying the periphery of said first diaphragm, a second diaphragm overlying and spaced from said first diaphragm having a periphery overlying said annular spacer and captured between said housings, and a back-up plate positioned centrally between said diaphragms to space said diaphragms and having a central projection extending through said second diaphragm, a perforate retainer plate surrounding said projection positioned against said second diaphragm, and a spring means bearing against said projection.

2. A pressure regulator for use in a fuel system for internal combustion engines utilizing a fuel pump and an air supply and including a base housing having a fuel inlet and a fuel outlet with a regulator valve opening interposed therebetween, and a closure housing secured to said base housing, that improvement which comprises a first diaphragm formed of a thin metal sheet overlying said valve opening and having a peripheral portion clamped between adjacent annular overlying portions of said housings, an annular metal ring welded to the periphery of said metal diaphragm, and compressible sealing rings interposed above and below said metal ring and the periphery of said diaphragm to seal chambers above and below said diaphragm when said base housing and said closure housing are clamped together.

3. A pressure regulator for use in a fuel system for internal combustion engines utilizing a fuel pump and an air supply and including a base housing having a fuel inlet and a fuel outlet with a regulator valve opening interposed therebetween, and a closure housing secured to said base housing, that improvement which comprises a first diaphragm formed of a thin metal sheet overlying said valve opening and having a peripheral portion clamped between adjacent annular overlying portions of said housings, a spacer ring having a central opening positioned between said metal diaphragm and the outer periphery of said closure housing, the inner periphery of said spacer ring overlying a portion of said diaphragm, and a back-up plate centrally of and bearing on said diaphragm having an outer axially extending peripheral flange within the central opening of said spacer ring to be guided and centered within said central opening, and a spring in said closure housing bearing on said back-up plate, wherein said back-up plate remains centered on said diaphragm during axial movement thereof.

\* \* \* \* \*